(12) United States Patent
Tan

(10) Patent No.: US 6,555,590 B1
(45) Date of Patent: Apr. 29, 2003

(54) TRANSPARENT SUPERMICROCELLULAR POLYMER FOAMS FROM HIGH $T_G$ POLYMERS AND METHOD FOR MANUFACTURE

(76) Inventor: Seng C. Tan, 3591 Apple Grove Dr., Beavercreek, OH (US) 45430

( * ) Notice: Subject to any disclaimer, the term of this patent is extended or adjusted under 35 U.S.C. 154(b) by 0 days.

(21) Appl. No.: 09/239,619

(22) Filed: Jan. 29, 1999

(51) Int. Cl.⁷ .................................................. C08J 9/14
(52) U.S. Cl. .......................... 521/79; 264/50; 264/51; 264/52; 264/53
(58) Field of Search .............................. 521/79; 264/50, 264/51, 52, 53

(56) References Cited

U.S. PATENT DOCUMENTS

| | | | | |
|---|---|---|---|---|
| 4,469,651 A | * | 9/1984 | Hahn et al. ................... | 521/51 |
| 4,473,665 A | * | 9/1984 | Martini-Viredensky et al. | 521/79 |
| 5,034,171 A | * | 7/1991 | Kiczek ......................... | 264/51 |
| 5,158,986 A | * | 10/1992 | Cha et al. ..................... | 521/79 |
| 5,340,846 A | * | 8/1994 | Rotter et al. ................. | 521/182 |
| 5,670,102 A | * | 9/1997 | Perman et al. ................ | 264/50 |
| 5,691,442 A | * | 11/1997 | Unroe et al. ................. | 528/125 |
| 5,851,617 A | * | 12/1998 | Keiser ......................... | 428/202 |

* cited by examiner

*Primary Examiner*—Morton Foelak

(57) ABSTRACT

A novel class of transparent polymeric foams from high $T_g$ polymers comprising submicron cells and a process for their production is described. The polymers are preferably high glass transition materials and the process comprises saturating a consolidated polymer shape with an inert gas at a temperature above the glass transition temperature of the polymer and under a pressure of at least 9000 psi for a period adequate to dissolve the gas in the polymer shape and then controllably cooling the polymer shape to produce the submicron cell structure.

16 Claims, 3 Drawing Sheets

TRANSPARENT SUPERMICROCELLULAR POLYMER FOAMS FROM HIGH $T_G$ POLYMERS AND METHOD FOR MANUFACTURE

FIELD OF THE INVENTION

The present invention relates to transparent polymeric materials containing sub-micron to nano size bubbles which demonstrate low density, high fracture toughness, high fracture strain, and lower haze than prior art similar such materials, and to a method for their fabrication.

BACKGROUND OF THE INVENTION

Current monolithic and laminated canopies and windscreens for fighter aircraft and the like are fabricated using PMMA (polymethyl methyl methacrylates) acrylics and bisphenol polycarbonates. These materials have relatively low use temperature limits, up to about 220° F. and 300° F. for acrylics and polycarbonates respectively. Wind tunnel testing of such structures conducted at Mach 1.6 to 3.0 at specific altitudes and exposure times showed that the transparency surface temperatures varied from 200° F. to 500° F. Consequently, there is a clearly perceived need for improved transparent materials, which demonstrate a higher temperature capability. Concurrently, in such applications, structural performance, optics (transparency and the avoidance of multiple imaging), and numerous other demanding capabilities are required of the material. As aircraft are produced to fly even faster and under more stringent conditions, these demands will all increase.

In the case of commercial aircraft, acrylics and polycarbonates are commonly used for subsonic canopies, windows and windscreens, since temperature is generally not an issue in such service. However, in the case of supersonic commercial aircraft, the demands will be very much the same as those for military aircraft. Additionally, due to thermal instability in a fire situation, windows of subsonic commercial aircraft tend to pop out, thus allowing air (oxygen) and flame to enter the cabin area more readily. The use of higher temperature capability transparent polymeric materials in these applications, is accordingly also desirable.

Recently, methods have been developed for the production of $T_g$ (202–350° C.) transparent polymers. Much of this work has involved the synthesis of new high $T_g$ polymers or polymer blends such as blends of polyetherketone with polyethersulfone, miscible sulfonated polyetheretherketone with polyetherimide, melt blends of phenylene ether phosphine oxide based on hydroquinone and bisphenol with polyeteretherketone, synthesis of aromatic polybenzoxazoles in trimethylsilyl polyphosphate, and 6F-polybenzoxazoles to obtain adequate transparency, structural capacity and temperature capability. A particularly interesting class of such materials and the methods of their synthesis are described in U.S. Pat. No. 5,691,442 to Unroe, et al issued November 1997 which is incorporated herein by reference. This patent describes improving the transparency of poly(arylene ether) homopolymers or copolymers by endcapping the polymeric chain with an unsubstituted phenolic-based endcapping agent. Such materials, when cast as thin films from chloroform, yield tough, transparent and colorless films. The $T_g$ of these materials is in the range of 207° C. and 281° C., their tensile strengths are in the range of 10.4–12.7 ksi, their tensile modulus in the range of 0.26 and 0.37 msi and their fracture strains in the range of 4% to 58%. When processed as thick sheet by injection molding or compression molding, however, the materials become yellow thus limiting applications as described above, that require good transparency.

Whatever the material used to fabricate canopies according to the prior art, such as thermal forming, injection molding, etc. the resulting structure was a "solid" material having the density of the parent polymeric material. Additionally, the thermal processing of "thick" sections of high $T_g$ polymers, of the type required for the aforementioned applications, generally produces an undesirable coloration as the thickness of the structure increases, as in the case of the polymers of Unroe et al. Alternatively, a complex and time consuming laminating process must be used to obtain structures, which demonstrate the required clarity.

The materials of the present invention, produced in accordance with the process of the present invention, contain up to about 30% voids and demonstrate highly desirable optical characteristics that are required for the above described applications while being significantly lighter, i.e. about 16% lighter because of their foamed structure.

DESCRIPTION OF THE DRAWINGS

The invention will be more fully understood from the following detailed description taken in conjunction with the accompanying drawings, which form a part of this application, and in which.

SUMMARY OF THE INVENTION

Figure 1:
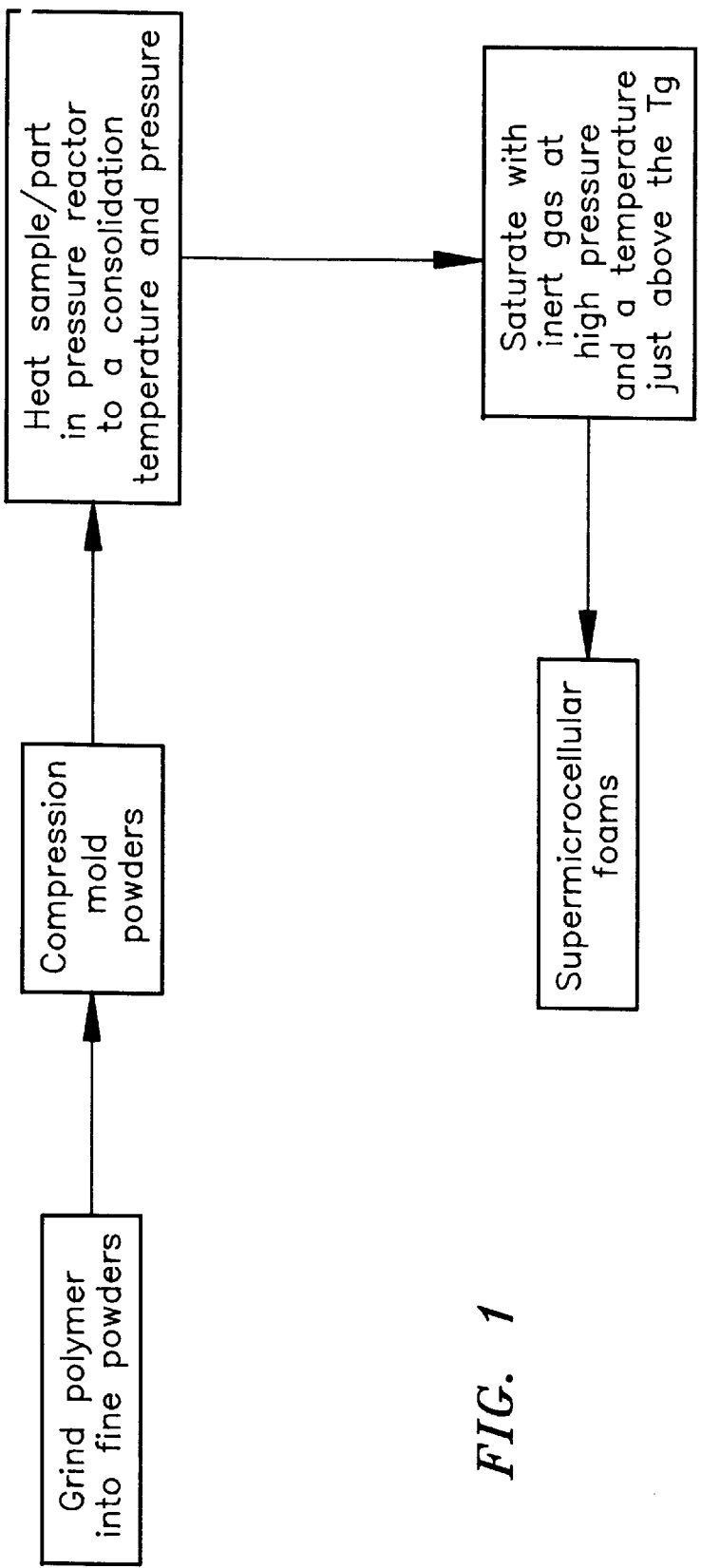
FIG. 1 is a block flow diagram of the process for producing the polymeric foams of the present invention.

The present invention provides a method for the production of novel polymeric foams which, because of the sub-micron or nano size of their component bubbles, is transparent and demonstrates enhanced optical and mechanical properties. High $T_g$ polymeric foams produced in accordance with the present invention, when compared to similar materials produced using conventional thermal processing techniques such as injection molding, exhibit fighter weight due to their foamed structure, higher fracture toughness, higher fracture strain, marginally higher fracture strength, in many cases improved optical clarity and modulus.

According to the present invention, polymer foams are produced by forming a desired shape from the desired polymer, heating the shape to a consolidation temperature under pressure, saturating the heated shape with an inert blowing gas at a temperature above the $T_g$ of the polymer at elevated pressure, and controllably releasing the pressure to cause the formation of sub-micron or nano sized bubbles. If thin films of the polymer are transparent to visible radiation, and the bubbles produced by the process are on the order of from about 0.1 to about 0.7 $\mu$m in size, since particles smaller than the wavelength of visible light are transparent to the human eye, the polymeric foams of the present invention will appear transparent. The present invention describes a method for producing bubbles of appropriate size in appropriate polymers to provide foamed polymeric materials in useful shapes that, while being transparent, exhibit enhanced mechanical properties.

DETAILED DESCRIPTION OF THE INVENTION

According to the present invention, polymer foams are produced by forming a shape from the desired polymer, heating the shape to a consolidation temperature under pressure, cooling down and saturating the heated polymer shape under inert gas at a temperature above the $T_g$ of the polymer, and controllably releasing the pressure to cause the formation of sub-micron or nano sized bubbles.

The process of the present invention is useful with virtually any polymer, which is capable of being formed into a suitable shape, and treated as described hereinafter. Specifically preferred polymers, however, are those that demonstrate a high $T_g$ (glass transition temperature), for example, above about 200° C. because of the utility of such polymers in meeting the high temperature and strength demands of such applications as aircraft canopies, etc.

In the current description, polymers of the type described in the aforementioned U.S. Pat. No. 5,691,442 to Unroe et al will be used to demonstrate a specific preferred process, however, it will be understood that any suitable polymer can be substituted therefor in the process described and claimed herein.

According to the preferred process of the present invention, a disk or other desired shape is produced by compression molding or otherwise, for example, by extrusion, injection molding etc. According to a highly preferred embodiment of the invention, the disk or shape is compression molded from a powder at a pressure above about 12000 psi. Vacuum is drawn inside the die during the compression molding cycle to remove air from the disk or shape as much as possible. The temperature of the disk or shape is then raised, in a pressure vessel, to the softening temperature of the polymer, in the case of the biphenyl endcapped poly(arylene ether) homopolymers of Unroe, between about 360 and 430° C., under a continuous feed of inert gas, for example, carbon dioxide, nitrogen, helium or any of the inert gases, and held under positive pressure for a period of from about 10 to about 50 minutes. This consolidation process serves to assure that the polymer shape has a continuous structure prior to further processing. If the disk or shape is already provided from another source in a transparent and suitably consolidated form, for example, injection molded, i.e. formed under consolidation conditions, then this step of consolidation may be excluded as consolidation has already been performed.

However the disk or shape is provided, after consolidation, the disk or shape is "saturated", i.e. subjected to heating to a temperature above its $T_g$, and to a pressure above about 9000 psi under an inert atmosphere for a period of from about 1 to about 5 hours. The temperature and soak or saturation time will, of course, be dependent upon the particular polymer being processed, the saturating gas utilized and the solubility of that gas in the particular polymer being foamed, but such parameters are readily determinable by the skilled artisan. According to a particularly preferred embodiment, saturation is performed at a temperature between the $T_g$ of the polymer and about 1.2 X $T_g$.

After the holding period is complete, the shape is cooled to room temperature. This cooling may be accomplished while either maintaining the soaking pressure or partially releasing the same until the temperature of the polymer shape has reached a temperature somewhat below the $T_g$ of the polymer. Once the shape has reached a temperature somewhat below the $T_g$ of the polymer or room temperature, the pressure is released. At this stage in the process, the "bubble structure" has been locked into the body of the shape. Further modification of the bubble size or foam morphology can be accomplished by heating the shape in an oven to a temperature at or just below the $T_g$ of the polymer.

The principal operating variables for controlling the nucleation rate and hence the cell density of the polymer are the applied saturation pressure and the solubility of the gas in the particular polymer being processed. Increasing either of these variables, i.e. pressure or solubility, increases the nucleation rate of the bubbles and consequently, increases the porosity of the foam.

EXAMPLES

Example 1

An biphenyl endcapped poly(arylene ether) thermoplastic polymer identified in U.S. Pat. No. 5,691,442 to Unroe et al in Example 1 as 6FETPP-E and commercially available from Daychem Laboratories, Inc., 143 Westpark Road, Dayton, Ohio 45459, was obtained in flake form. The material was dried, ground into fine particles and compression molded into sample disks approximately 1.125 to about 2.256 inches in diameter and 0.125 inches thick.

Figure 2:
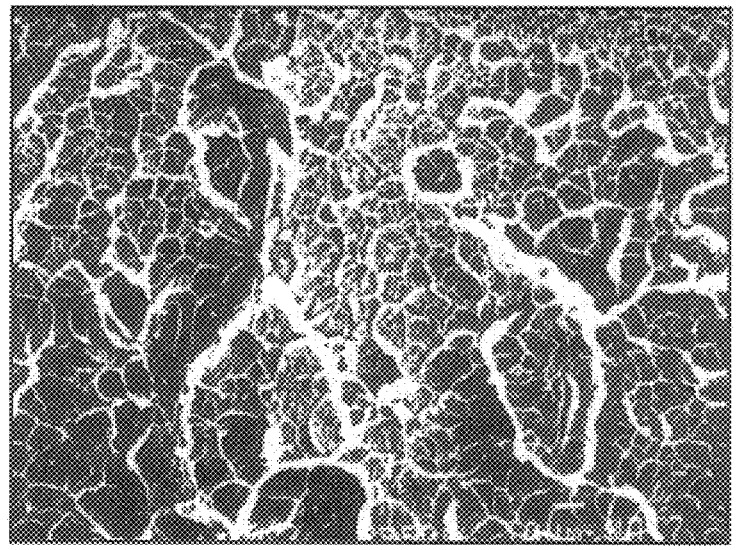
FIG. 2 is an SEM photomicrograph of a transparent sample as produced in Example 1.
Figure 3:
FIG. 3 is an SEM photomicrograph of a foamed material prepared in accordance with a modified practice of the present invention as described in Example 1.

The sample disks were then saturated in a pressure vessel at temperatures ranging from about 320° C. to about 380° C. at pressures between about 9000 and 9200 psi. The densities of the sample disks ranged from about 1.13 g/cc to about 1.20 g/cc depending upon the processing temperature and pressure. A spectrum of transparencies was obtained depending upon the size of the bubbles formed in the processing. Those samples using a higher saturation temperature at the upper end of the previously mentioned range had larger bubbles than those processed at the lower end of the range, and consequently, the former did not demonstrate the same degree of optical clarity as the latter. This is shown in FIGS. 2 and 3. FIG. 2 is an SEM of the most optically clear sample showing only sub-micron bubbles. FIG. 3 is an SEM of a sample produced at a higher saturation temperature range showing that the bubbles are larger than those shown in FIG. 2. This sample exhibited a lower optical clarity than that shown in FIG. 2.

Transparent sample materials from this processing tested for haze and transmittance according to ASTM D1003 demonstrated values of between about 19 and 24% for haze and 69 and 73% for transmittance. These values did not change appreciably between room temperature and 330° F.

Mechanical properties for samples from this processing showed ultimate strengths on the order of 10,700 psi, a chord modulus above about 470,000 psi (strain gauges broke before specimens failed). Additionally, these materials demonstrated fracture toughness values up 3.5 times those of the parent material, and higher fracture strain values, up to 81%, than those of the parent material.

Example 2

Figure 4:
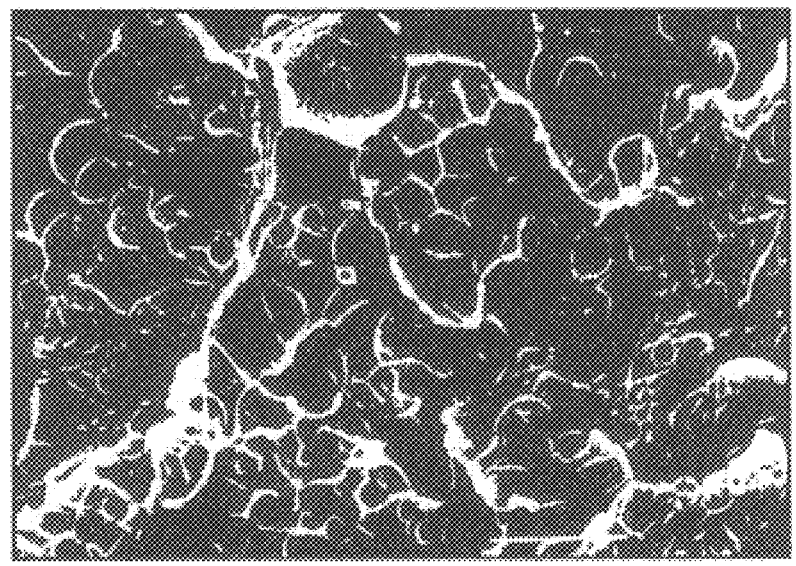
FIG. 4 is an SEM photomicrograph of a foamed material produced in accordance with the present invention that has received further thermal processing in accordance with Example 2 of this disclosure.
Figure 5:
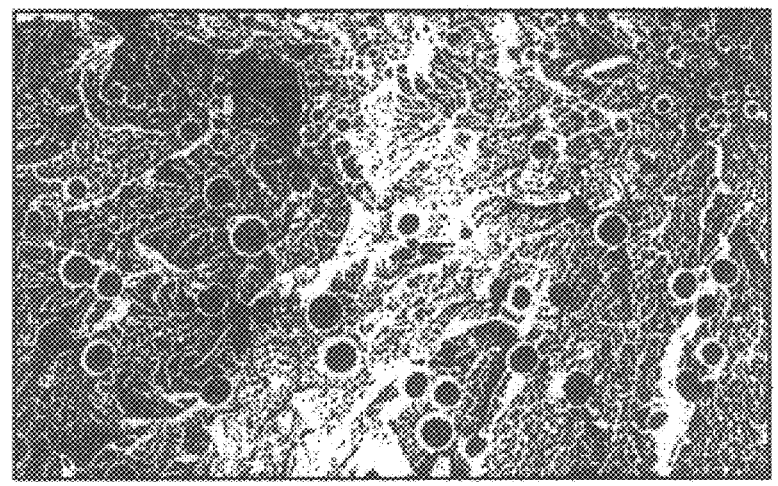
FIG. 5 is an SEM photomicrograph of a foamed material produced in accordance with the present invention that has received further thermal processing in accordance with Example 2 of the present invention.

In order to show the ability to alter the foam morphology after the bubbles are "locked in" by initial processing, samples prepared in Example 1 were slowly heated in an oven to a temperature just above the $T_g$ of the polymer. As shown in FIGS. 4 and 5, the bubbles grow as soak time in the oven at elevated temperature just above the $T_g$ are lengthened. In FIG. 4 the bubbles have grown to 1–2 microns, while further soaking results in the bubbles growing to 10–20 microns, as shown in FIG. 5. While such materials are clearly useful in many applications, they are not transparent.

Example 3

A second biphenyl endcapped(arylene ether) polymer identified as BPETPP in Unroe et al in Example V, and commercially available from Eikos, 115 Dean Ave., P.O. Box 328, Franklin, Mass. 02038 was processed similarly to the material processed in Example 1 except that consolidation was performed at between 400 and 430° C. The resulting foam had a $T_g$ of about 222° C. and was stable and maintained its transparency up to about 400° F.

Example 4

A third biphenyl endcapped(arylene ether) identified in Example V11 of Unroe et al as FEK-E also available in flake form from Daychem Laboratories, Inc. was processed as described in Example 1 above, except that consolidation was performed at 420° C. and saturation was performed at 250–280° C. Transparent samples having a $T_g$ of about 247° C. were obtained.

Example 5

A fourth biphenyl endcapped poly(arylene ether) identified in Unroe et al in Example V111 as FETPP-E also commercially available from Daychem Laboratories, Inc. was processed as described in Example 1 except that consolidation was performed at a temperature of about 410–450° C. and gas saturation was performed above 281–320° C. Transparent samples having a $T_g$ of about 281° C. were obtained.

From the foregoing description, one skilled in the art can easily ascertain the essential characteristics of this invention, and without departing from the spirit and scope thereof, make various changes and modifications of the invention to adapt it to various usages and conditions. It is therefore intended that the scope of the invention is limited only by the scope of the appended claims.

What is claimed is:

1. A process for the production of microcellular polymeric foams having cell sizes below about 1 $\mu$ comprising:
   a) saturating a consolidated polymer shape comprised of a polymer having a glass transition temperature above about 200° C. with a gas in an inert atmosphere at a temperature above said polymer glass transition temperature and at an elevated pressure of at least about 9000 psi; and
   b) controllably cooling said polymer to a temperature below the glass transition temperature of said polymer.

2. The process of claim 1 wherein said cooling is performed after at least partially releasing said pressure.

3. The process of claim 1 wherein said cooling is performed by cooling said polymer to a temperature below the glass transition temperature of said polymer while maintaining said elevated pressure and subsequently reducing the temperature to ambient.

4. The process of claim 1 wherein said saturating is performed at a temperature between the glass transition temperature and about 1.2 times the glass transition temperature of said polymer.

5. The process of claim 1 wherein said consolidated polymer is produced by subjecting a shape made from a fine powdered form of said polymer to a pressure of at least about 12,000 psi, heating to a temperature equal to or greater than the softening temperature of said polymer and holding for a period of from about 10 to about 60 minutes under an inert atmosphere.

6. The process of claim 1 wherein said saturating is performed at a temperature between the glass transition temperature and about 1.2 times the glass transition temperature of said polymer, and the consolidated polymer is produced by subjecting a fine powder of said polymer to a pressure of at least about 12,000 psi under an inert atmosphere and heating the polymer to a temperature above the softening point of said polymer.

7. A polymeric foam of a polymer having a $T_g$ above about 200° C. comprising individual cells less than about 0.7 $\mu$m in diameter produced from a polymer selected from the group consisting of biphenyl endcapped poly(arylene ether), 6F-polybenzoxazoles, polymer blends of polyetherketone with polyethersulfone, miscible sulfonated polyetherketone with polyetherimide, melt blends of phenylene ether phosphine oxide based hydroquinone and bisphenol with polyetherketone, and aromatic polybensoxaxoles in trimethyl polyphosphate.

8. The polymeric foam of claim 7 wherein said cooling is performed after partially releasing said pressure.

9. The polymeric foam of claim 7 wherein said cooling is performed by cooling said polymer to a temperature below the glass transition temperature of said polymer while maintaining said elevated pressure.

10. The polymeric foam of claim 7 wherein said saturating is performed at a temperature between the glass transition temperature and about 1.2 times the glass transition temperature of said polymer.

11. The polymeric foam of claim 7 wherein said consolidated polymer is produced by subjecting a shape made from a fine powdered form of said polymer to a pressure of at least about 12,000 psi, heating to a temperature equal to or greater than the softening temperature of said polymer and holding for a period of from about 10 to about 60 minutes under an inert atmosphere.

12. The polymeric foam of claim 7 wherein said saturating is performed at a temperature between the glass transition temperature and about 1.2 times the glass transition temperature of said polymer, and the consolidated polymer is produced by subjecting a fine powder of said polymer to a pressure of at least about 12,000 psi under and inert atmosphere, heating to a temperature above the softening point of said polymer and holding for a period of from about 10 minutes to about 60 minutes under said inert atmosphere.

13. The polymeric foam of claim 7 produced from a polymer selected from the group consisting of biphenyl endcapped poly(arylene ether), 6F-polybenzoxazoles, polymer blends of polyetherketone with polyethersulfone, miscible sulfonated polyetherketone with polyetherimide, melt blends of phenylene ether phosphine oxide based hydroquinone and bisphenol with polyetherketone, and aromatic polybensoxaxoles in trimethyl polyphosphate.

14. The process of claim 1 wherein said polymer foam is transparent.

15. The polymeric foam of claim 7 that is transparent.

16. A microcellular polymeric foam having a cell size below about 1 $\mu$ made by a process comprising:
   a) saturating a consolidated polymer shape comprised of a polymer having a glass transition temperature above about 200° C. with a gas in an inert atmosphere at a temperature above said polymer glass transition temperature and at an elevated pressure of at least about 9000 psi;
   b) controllably cooling said polymer to a temperature below the glass transition temperature of said polymer; and
   c) reducing said temperature to ambient.

* * * * *